United States Patent
Grill et al.

(10) Patent No.: US 7,417,532 B2
(45) Date of Patent: Aug. 26, 2008

(54) METHOD AND DEVICE FOR SIGNALING SEVERAL PIECES OF INFORMATION THAT ARE RELEVANT FOR OPERATING A MOTOR VEHICLE

(75) Inventors: Michael Grill, Stuttgart (DE); Mario Kustosch, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 103 days.

(21) Appl. No.: 10/522,296

(22) PCT Filed: Feb. 3, 2003

(86) PCT No.: PCT/DE03/00291

§ 371 (c)(1),
(2), (4) Date: Sep. 22, 2005

(87) PCT Pub. No.: WO2004/016464

PCT Pub. Date: Feb. 26, 2004

(65) Prior Publication Data

US 2006/0109097 A1  May 25, 2006

(30) Foreign Application Priority Data

Jul. 24, 2002  (DE) ............................. 102 33 570

(51) Int. Cl.
 *B60Q 1/00* (2006.01)

(52) U.S. Cl. .................................... 340/439; 340/438
(58) Field of Classification Search ................. 340/439, 340/438, 705; 364/424.04, 442, 431.01; 701/123

See application file for complete search history.

(56) References Cited

U.S. PATENT DOCUMENTS

| 3,982,510 A | 9/1976 | Van Ostrom |
| 4,510,906 A * | 4/1985 | Klatt ........................... 123/396 |
| 5,627,752 A * | 5/1997 | Buck et al. ..................... 701/35 |

FOREIGN PATENT DOCUMENTS

| DE | 196 20 929 | 11/1997 |
| DE | 100 26 048 | 12/2001 |
| EP | 0 633 155 | 1/1995 |

* cited by examiner

*Primary Examiner*—George A Bugg
*Assistant Examiner*—Shirley Lu
(74) *Attorney, Agent, or Firm*—Kenyon & Kenyon LLP

(57) ABSTRACT

A method and a device for signaling several items of information relevant for operating a motor vehicle are provided, which are registered by the driver of the vehicle in a particularly reliable manner, and which do not distract the driver from the traffic. To this end, different items of information are represented by unambiguous haptic signals, particularly having a maximum, at different positions of a control element of the vehicle, particularly an accelerator pedal.

10 Claims, 5 Drawing Sheets

METHOD AND DEVICE FOR SIGNALING SEVERAL PIECES OF INFORMATION THAT ARE RELEVANT FOR OPERATING A MOTOR VEHICLE

FIELD OF THE INVENTION

The present invention relates to a method and a device for signaling several items of information relevant for operating a motor vehicle according to the species of the independent claims.

BACKGROUND INFORMATION

Methods and devices for signaling several items of information relevant for operating a motor vehicle are already known. For example, a visual display for the current fuel consumption is already provided standard in many vehicles and promotes the consciousness for an economical driving style. For this purpose, different fuel consumption values can be represented visually.

SUMMARY OF THE INVENTION

By contrast, the method according to the present invention and the device according to the present invention for signaling have the advantage that different items of information are represented by unambiguous haptic signals, particularly having a maximum, at different positions of a control element of the vehicle, particularly an accelerator pedal. The haptic signaling secures the advantage that the driver of the vehicle registers the corresponding information without having to take his eyes from the roadway. The risk of an accident is reduced in this manner. If the haptic signaling occurs via a control element constantly operated by the driver, for example the accelerator pedal, this ensures that the driver registers the items of information transmitted via the haptic signals. The haptic signaling does not distract from traffic events and also does not present a safety risk.

Advantageous further developments and improvements of the method indicated in the main claim are rendered possible by the measures specified in the dependent claims. Particularly advantageous is the fact that different items of information are formed by different fuel consumption values. Thus different fuel consumption values can be haptically signaled at different positions of the control element and hence be unequivocally differentiated for the driver. Thus via haptic signaling it is possible to convey to the driver of the vehicle a quantitative statement regarding the current fuel consumption.

It is also advantageous if the different fuel consumption values are respectively represented by a characteristic of the haptic signaling on the control element, particularly a sawtooth-shaped characteristic, having a maximum at the associated position of the control element. In this manner it is possible to signal the different fuel consumption values haptically in a particularly simple manner and with little expenditure at the associated position of the control element. This ensures furthermore that a specific fuel consumption value results in a maximum in the haptic signaling at only one single position of the control element such that additional positions of the control element are available for the representation of further fuel consumption values using haptic signaling. In a particularly simple manner, this allows for a quantitatively differentiable haptic signaling of different fuel consumption values.

It is also advantageous if at least one fuel consumption value to be signaled is specified using an input unit. In this manner, the driver of the vehicle himself is able to determine what fuel consumption values are to be signaled to him. Haptic signaling of the fuel consumption values is thus adapted to the requirements of the driver.

A further advantage is the fact that one of the haptic signals represents an optimum engine efficiency factor. In this manner, the haptic signaling on the control element is also able to represent different types of information.

It is particularly advantageous in this regard that the optimum engine efficiency factor is represented by a haptic signal that takes effect beginning from a position of the control element associated with the optimum engine efficiency factor. In this way, the haptic signaling of the optimum engine efficiency factor can be differentiated from a possibly existing haptic signaling of one or more fuel consumption values in the type of haptic signaling and thus be registered by the driver in a differentiated manner.

A further advantage is the fact that the haptic signaling is formed by a restoring force acting at the control element. In this way, the haptic signaling can be implemented in a manner that is particularly simple and effective for the driver since in the essentially constant operation of the control element the driver will in all probability register such a restoring force.

DETAILED DESCRIPTION

Figure 1:
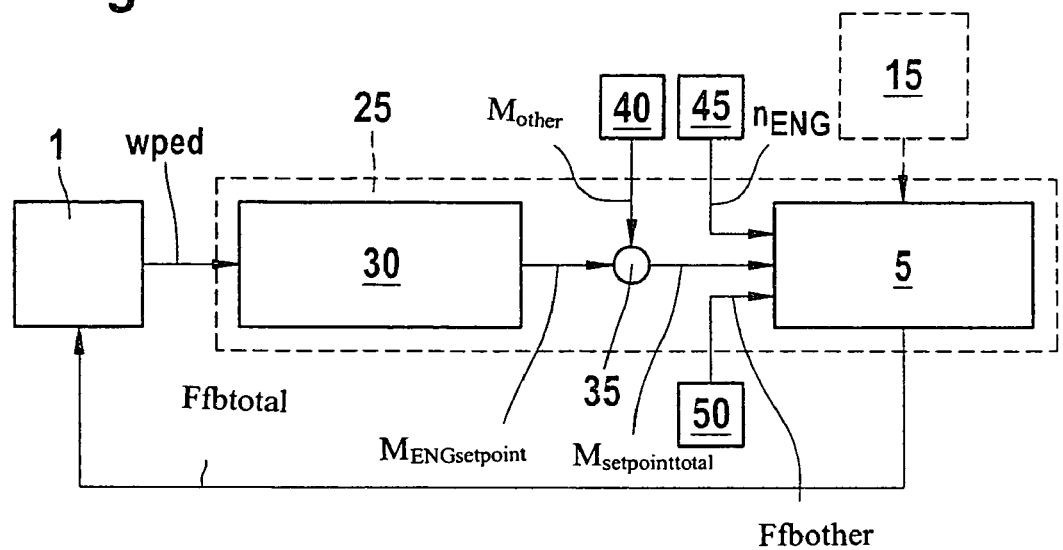
FIG. 1 shows a block diagram with a device according to the present invention.

In FIG. 1, 25 indicates a control unit of a motor vehicle having a drive unit, which includes for example a spark-ignition engine, a diesel engine, an electric motor or the like, or which is based on an arbitrary alternative drive concept. The vehicle furthermore includes a control element 1, which takes the form of an accelerator pedal for example. Control unit 25 includes a driver request interpretation unit 30, which is connected to accelerator pedal 1. From the position wped of accelerator pedal 1 operated by the driver, driver request interpretation unit 30 ascertains a setpoint value for an output quantity of the drive unit. This output quantity could be an engine output torque, for example, or a wheel output torque or a power output or an output quantity derivable from the mentioned quantities. In the following, it shall be assumed by way of example that the output quantity of the drive unit is an engine output torque. In a manner known to one skilled in the art, driver request interpretation unit 30 thus forms a setpoint value $M_{ENGsoll}$ for the engine output torque of the drive unit from the position wped of accelerator pedal 1. Setpoint value $M_{ENGsoll}$ thus formed as a function of the driver request is sent to a first summing element 35, where it is added to a resulting torque requirement $M_{sonst}$, which is formed by a coordinator 40 as a function of the other torque requirements. The other torque requirements may for example arise from the compensation of the torque requirements of ancillary components of the vehicle such as, for example, an air-conditioning system, a car radio or a servomotor, or from an idle speed control. The coordination of these other torque requirements in coordinator 40 also occurs in a manner known to one skilled in the art. The sum formed by first summing element 35 is a resulting total setpoint value $M_{sollges}$, which is supplied to a device 5 according to the present invention. Device 5 is used for haptic signaling on control element 1, that is, in this example on accelerator pedal 1. This haptic signaling may occur, for example, by generating a suitable restoring force on accelerator pedal 1. In device 5, an engine speed sensor 45 supplies a current engine speed $n_{ENG}$ of an engine driving the drive unit, which, as described, may be a spark-ignition engine, a diesel engine or an electric motor for example. Furthermore, a coordinator 50 for other restoring force requirements on accelerator pedal 1 may be optionally provided, which forms a resulting restoring force Ffbsonst for these other restoring force requirements. This could be a haptic feedback for maintaining a safety distance for example. The resulting restoring force requirement Ffbsonst is likewise sent to device 5. Optionally, an input unit 15, as represented in FIG. 1 using dashed lines, may also be provided. In input unit 15, the driver may for example specify one or more fuel consumption values. These are likewise supplied to device 5. According to FIG. 1, control unit 25 includes driver request interpretation unit 30, first summing element 35 and device 5. Control unit 25 may be implemented for example as hardware and/or software, the software being executable by a microchip. Device 5 ascertains from the supplied input quantities a resulting total restoring force Ffbges and triggers accelerator pedal 1 to set this resulting total restoring force Ffbges. This may be implemented in a manner known to one skilled in the art using an actuator, electronically triggered by device 5 but not shown in FIG. 1, for setting a spring force acting counter to the direction of operation of accelerator pedal 1

For the following considerations, it shall be assumed by way of example that the vehicle is driven by a combustion engine, that is, for example by a spark-ignition engine or a diesel engine. The considerations, however, apply generally to the energy consumption of the vehicle. During an acceleration process, the fuel consumption corresponds to the power required for overcoming the mass inertia of the vehicle. The fuel consumption during the acceleration process can be minimized in that the driver maintains the engine at a favorable operating point by a defined position of the accelerator pedal, an accelerator pedal position which according to the present invention is to be indicated to the driver by a haptic signal on accelerator pedal 1.

Figure 2:
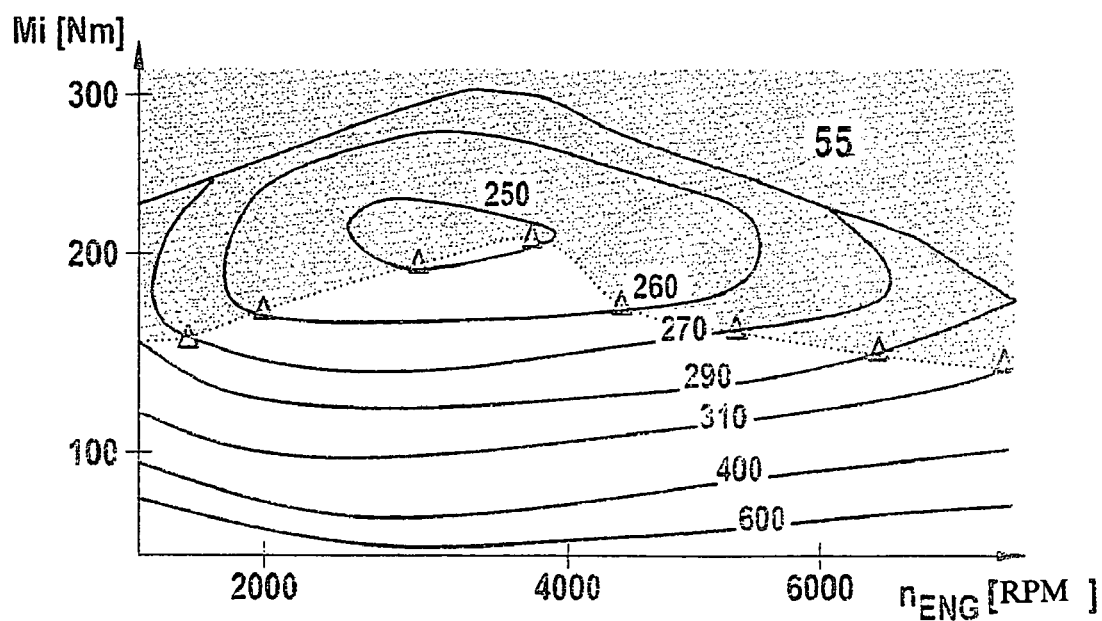
FIG. 2 shows a characteristics map for ascertaining a specific fuel consumption of the motor vehicle.

FIG. 2 shows a so-called conchoid characteristics map of a combustion engine, in which the output torque of the engine, the so-called indicated torque Mi in Nm, is plotted against the engine speed $n_{ENG}$ in RPM. The indicated torque Mi and the engine speed $n_{ENG}$ define a characteristics map for a specific fuel consumption of the vehicle in g/kWh, in that isolines are represented for this specific fuel consumption in the specified unit. The characteristics map may be ascertained on an engine test stand in that with the specification of the engine speed $n_{ENG}$ and the load, which is implemented for example by an eddy-current brake, the ratio between the fuel quantity consumed and the mechanical work performed at the crankshaft is ascertained. This ratio is indicated by Be. The ratio Be is the specific fuel consumption. The specific fuel consumption Be is then plotted, according to FIG. 2, against the engine speed and the indicated torque Mi, which represents the load varied by the eddy-current brake in a manner known to one skilled in the art. For this purpose, the indicated torque Mi may be ascertained as an average value for the respective braking effect of the eddy-current brake over a specified time period. If one connects all points in the characteristics map that have an approximately equal specific fuel consumption Be, then one obtains, as represented in FIG. 2, conchoid isolines or contour lines that give this characteristics map its name.

Figure 3:
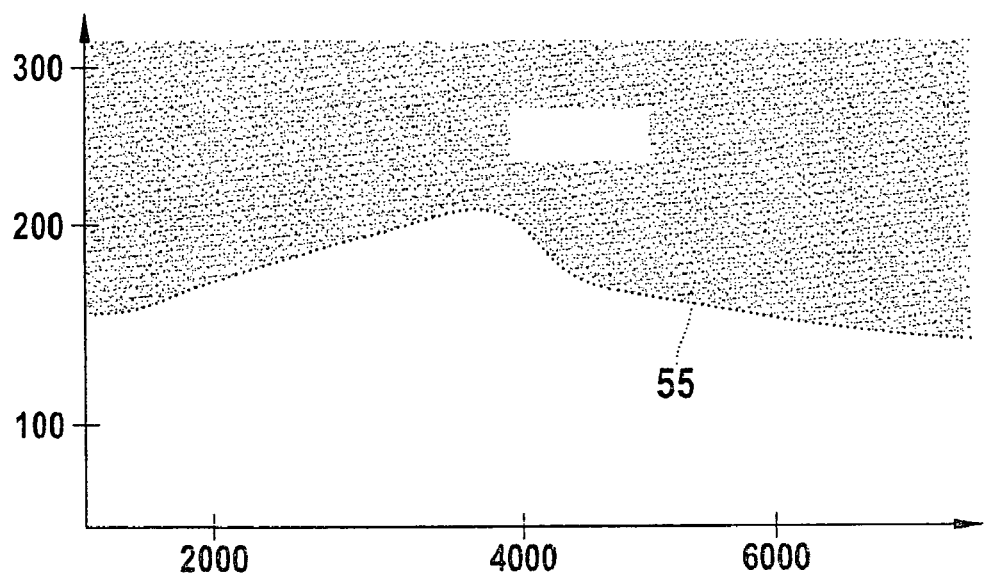
FIG. 3 shows a characteristics map for ascertaining a restoring force for an accelerator pedal of the vehicle.

For every engine speed $n_{ENG}$, there is exactly one minimal specific fuel consumption Be and thus exactly one optimum efficiency factor. In FIG. 2, the points with the minimal specific fuel consumption for different engine speeds $N_{ENG}$ are indicated by triangles. If one connects the points of the minimal specific fuel consumption to one another, one obtains the dotted line in FIG. 2, which is indicated by reference numeral 55. In the following, this line 55 is also referred to as the line of the minimal specific fuel consumption. FIG. 3 shows a characteristics map, in which the characteristic of a haptic signal $F_{FB}$ in N and with it a restoring force for accelerator pedal 1 is plotted against engine speed $n_{ENG}$ in RPM on the abscissa and the indicated engine torque Mi in Nm on the ordinate. The characteristic of this haptic signal $F_{FB}$ results from dotted line 55 of the minimal specific fuel consumption according to FIG. 2 in that the regions above and below this line 55 are separated from each other by different values of restoring force $F_{FB}$. In particular, these may be two different values, that is, a first restoring force F1 above line 55 of the minimal specific fuel consumption and a second restoring force F2 below this line 55, it being possible, for example, that first restoring force F1 is greater than second restoring force F2 and second restoring force F2 is equal to zero. In this manner it is possible to signal to the driver the optimum operating point of the drive unit and thus the optimum engine efficiency factor by increasing the restoring force $F_{FB}$ on accelerator pedal 1. In the event that, as described, first restoring force F1 is greater than second restoring force F2 and second restoring force F2 is equal to zero, this will result in the optimum efficiency factor of the engine for the accelerator pedal position, at which the driver will sense a corresponding increase in the resistance and thus of the restoring force when operating accelerator pedal 1.

Figure 4:
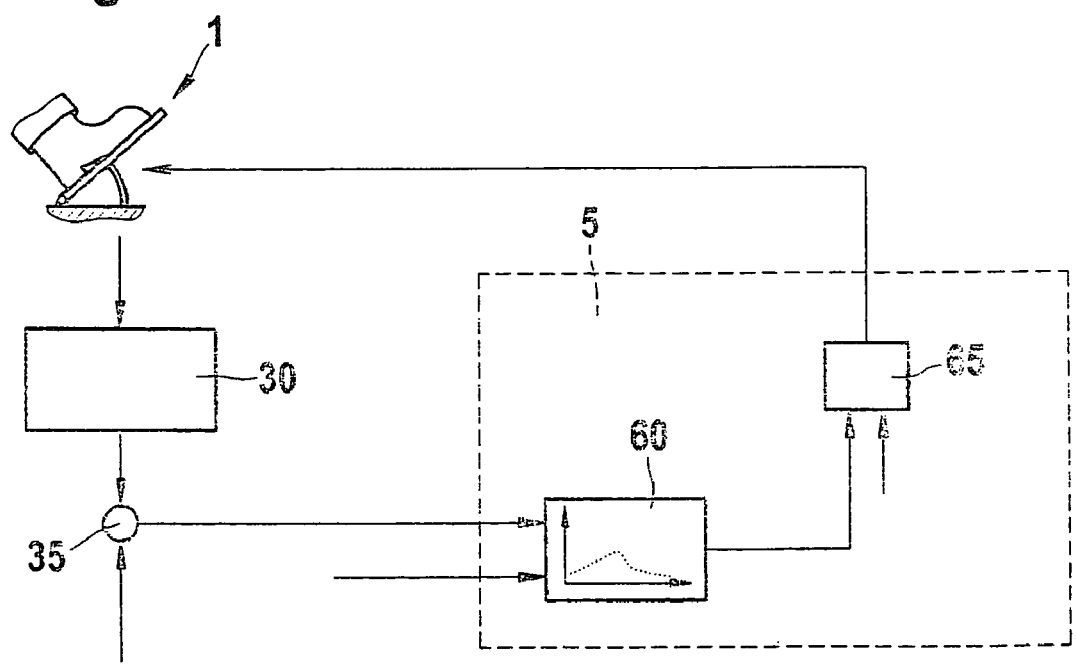
FIG. 4 shows a flow chart for illustrating the functioning of the device according to the present invention and of the method according to the present invention.

FIG. 4 shows a flow chart to illustrate the functioning of device 5 according to the present invention as well as of the method according to the present invention. In FIG. 4, identical reference numerals denote identical elements as in FIG. 1. In contrast to the block diagram in FIG. 1, however, FIG. 4 additionally explains in more detail the structure of device 5 according to the present invention. Device 5, which may be implemented as a software structure on a microchip for example, includes a characteristics map function 60, which implements the conchoid characteristics map from FIG. 2, and which receives the resulting total setpoint torque Msollges supplied by first summing element 35 as well as the current engine speed $n_{ENG}$ as input quantities. From this, characteristics map function 60 ascertains as output quantity the haptic signal $F_{FB}$ in that a check is performed as to whether the operating point formed by current engine speed $n_{ENG}$ and the resulting total setpoint torque Msollges lies above or below line 55 of the minimal specific fuel consumption. If the operating point lies above line 55, then $F_{FB}$ is equal to F1, otherwise $F_{FB}$ is equal to F2. Haptic signal $F_{FB}$ is supplied to a maximum selector element 65, to which the restoring force coordinator 50 additionally supplied the resulting restoring force requirement $F_{fbsonst}$ of the other restoring force requirements. From the quantities supplied, maximum selector element 65 selects the maximum and issues it as resulting haptic signal Ffbges to accelerator pedal 1 for setting the corresponding restoring force. Maximum selector element 65 limits the restoring force on accelerator pedal 1 downward to ensure that, following its release, the accelerator pedal returns again to its starting position.

The method according to the present invention and the device 5 according to the present invention allow the driver, by virtue of the haptic signaling on accelerator pedal 1, to drive and accelerate using the optimum efficiency factor of the engine In addition, by contrast with a visual display, a haptic signal on accelerator pedal 1 is constantly present to the consciousness of the driver and does not have an irritating effect and one that distracts from traffic.

Figure 5:
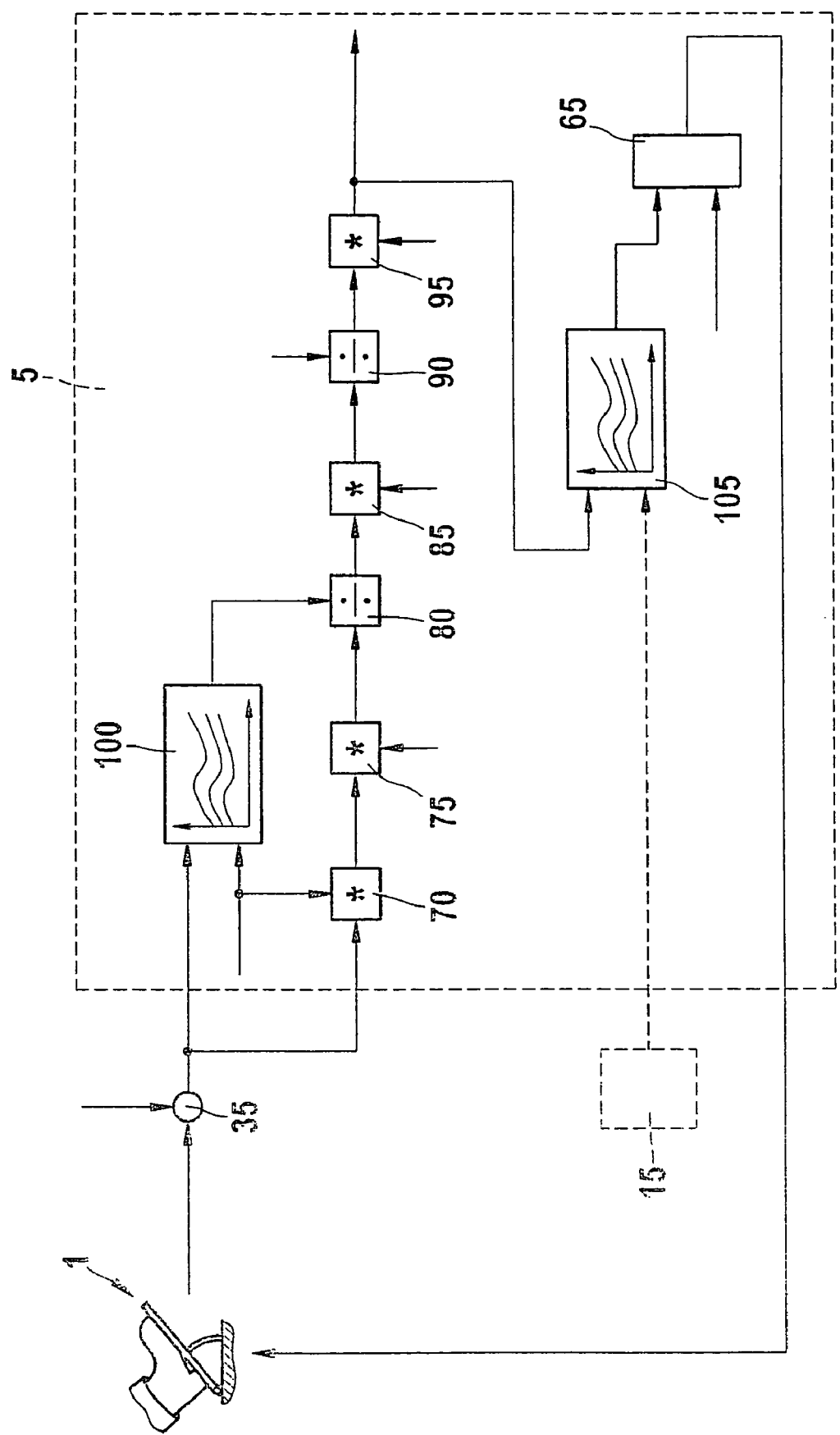
FIG. 5 shows a further flow chart for illustrating the structure of the device according to the present invention and the sequence of the method according to the present invention.
Figure 6:
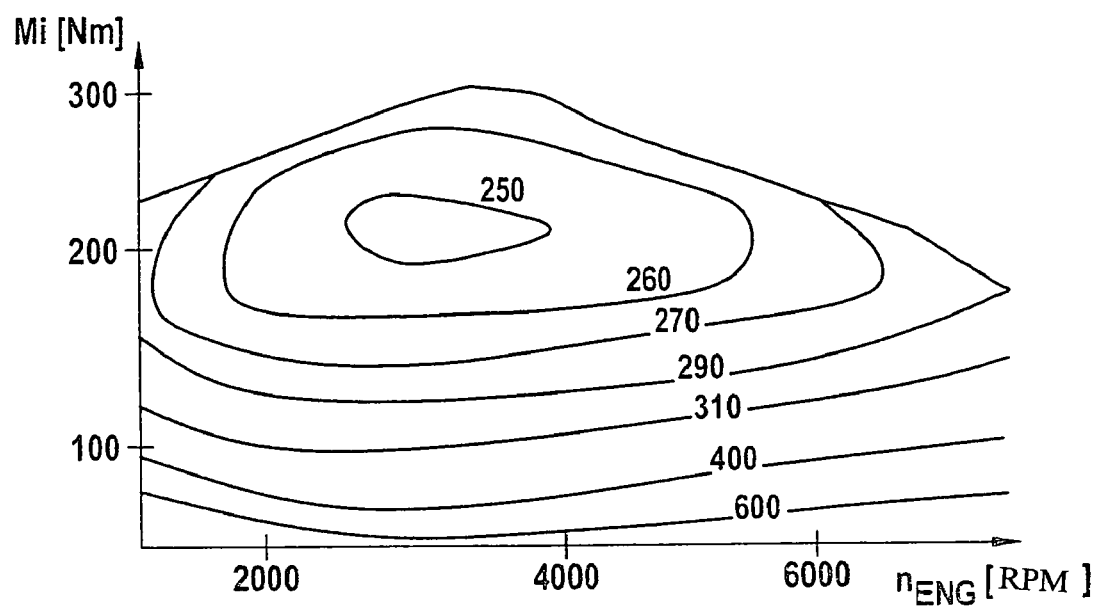
FIG. 6 shows a characteristics map for ascertaining a specific fuel consumption.

FIG. 5 shows a second exemplary embodiment for device 5 starting from the block diagram in FIG. 1, identical reference numerals again denoting identical elements as in the previous figures. In this alternative specific embodiment, the resulting total setpoint torque Msollges issued by first summing element 35 and the current engine torque $n_{ENG}$ are supplied to a second characteristics map function 100 of device 5, which, starting from the conchoid characteristics map in FIG. 2, which in FIG. 5 is represented once more but without line 55 of the minimal specific fuel consumption, ascertains for the operating point of the drive unit defined by resulting total setpoint torque $M_{sollges}$ and current engine speed $n_{ENG}$ the associated specific fuel consumption Be from the conchoid characteristics field. Parallel to the ascertainment of the specific fuel consumption, the mechanical power output at the crankshaft of the combustion engine is calculated by multiplying resulting total setpoint torque $M_{sollges}$ and current engine speed $n_{ENG}$ in a first multiplication element 70 and is converted in a second multiplication element 75 into the unit kW using a first conversion factor E1 in a manner known to one skilled in the art. Thus, at the output of second multiplication element 75, the mechanical power output P is available in kW. In a first division element 80, the specific fuel consumption Be ascertained by second characteristics map function 100 is divided by the power output P in kW at the output of second multiplication element 55 so as to ascertain the fuel consumption in g/h. The result of this division is supplied to a third multiplication element 85 where it is converted by multiplication with a second conversion factor E2 in such a manner, known to one skilled in the art, that it results in a fuel consumption in l/h. Thus third multiplication element 85 converts the unit g into l with the aid of the specific density of the fuel used, the second conversion factor E2 corresponding to the inverse value of this specific density and the density referring to l. In a second division element 90, the output of third multiplication element 85 is divided by the current speed of the vehicle, which is measured, for example, by a speed measuring device in a manner known to one skilled in the art and is supplied to second division element 90. The output of second division element 90 thus yields the fuel consumption in 1/(m/s). This is multiplied in a fourth multiplication element 95 by a third conversion factor E3 in a manner known to one skilled in the art in order to convert the unit m/s into the unit km/h so that the output of fourth multiplication element 95 yields a fuel consumption be per distance traveled in 1/(100 km). This fuel consumption be per distance traveled may be displayed in a visual display device of the vehicle. In the following, the fuel consumption be per distance traveled is also referred to as the consumption per unit of distance be.

Figure 7:
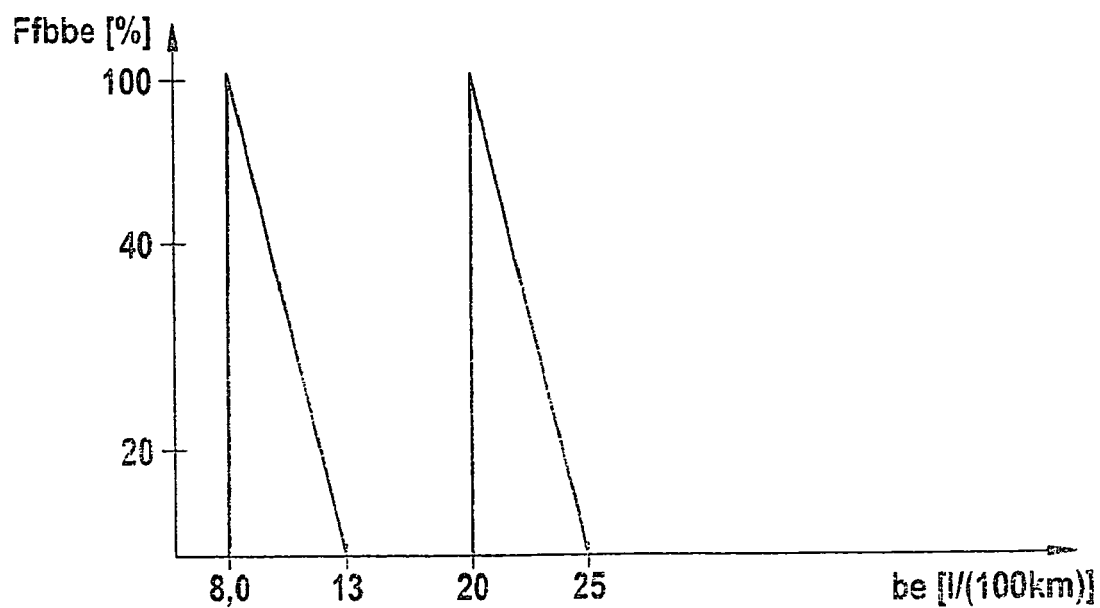
FIG. 7 shows a characteristic of a restoring force of an accelerator pedal as a function of the fuel consumption.

Consumption per unit of distance be is supplied to a characteristics function 105, which as a function of the consumption per unit of distance be ascertains a second haptic signal Ffbbe and supplies it to maximum selector element 65 together with the resulting restoring force requirement Ffbsonst of the other restoring force requirements. Maximum selector element 65 performs a maximum selection of the two supplied quantities so that the greater of the two input values is implemented at control element 1 in the manner described as the resulting haptic signal or as the resulting total restoring force requirement Ffbges. FIG. 7 illustrates an example for characteristics function 105. In this instance, second haptic signal Ffbbe as a percentage of the maximum restoring force is plotted against consumption per unit of distance be in 1/(100 km). At the consumption per unit of distance of 8l/(100 km), this second haptic signal Ffbbe rises sharply to 100% and subsequently levels off comparatively slowly to the consumption per unit of distance of 13l/(100 km). At a consumption per unit of distance of 20l/(100 km), the second haptic signal again rises sharply to 100% and subsequently levels off again comparatively slowly to a consumption per unit of distance of 25l/(100 km). According to the example in FIG. 7, this yields for the second haptic signal for the consumption per unit of distance between 8 and 13l/(100 km) as well as for the consumption per unit of distance between 20 and 25l/(100 km) in each case approximately the same saw-tooth-shaped characteristic having a maximum of 8l/(100 km) or 20l/(100 km). Due to its steep rise, the choice of the saw-tooth-shaped characteristic allows for the associated consumption per unit of distance to be clearly impressed upon the driver. The respective subsequent leveling off or sloping down of second haptic signal Ffbbe allows for a later renewed rise and thus makes room for the signaling of additional items of information or consumptions per unit of distance via the restoring force on accelerator pedal 1. For this purpose, the consumptions per unit of distance be may be specified in a fixed manner in device 5 with the maximum of second haptic signal Ffbbe or may be specified by the driver at input unit 15 and be supplied to characteristics function 105 according to the dashed arrow in FIG. 5 so that the driver can choose for himself at what consumption per unit of distance or at what consumptions per unit of distance accelerator pedal 1 should generate the maximum restoring force of 100% according to second haptic signal Ffbbe. To this end, the driver is able to specify via input unit 15 one or several consumptions per unit of distance at which the maximum restoring force should be generated on accelerator pedal 1. Additional consumptions per unit of distance with a maximum restoring force on accelerator pedal 1 may be optionally specified in a fixed manner by the manufacturer and may be stored in a memory assigned to device 5 and supplied to characteristics function 105. According to the present invention, there may now be a further provision for device 5 to include the functionality according to FIG. 4 as well as the functionality according to FIG. 5, the maximum selector element 65 then being supplied both with first haptic signal $F_{FB}$ as well as with second haptic signal Ffbbe as well as with the resulting restoring force requirement Ffbesonst, and the resulting haptic signal Ffbges generated by maximum selector element 65 representing the maximum of the three mentioned input quantities. In this manner, using the haptic signal, i.e. in this example the restoring force on accelerator pedal 1, it is possible to signal different types of information, namely, one the one hand, one or more different consumptions per unit of distance, for example according to FIG. 7, and, on the other hand, an optimum engine efficiency factor according to first characteristics map function 60.

Figure 8:
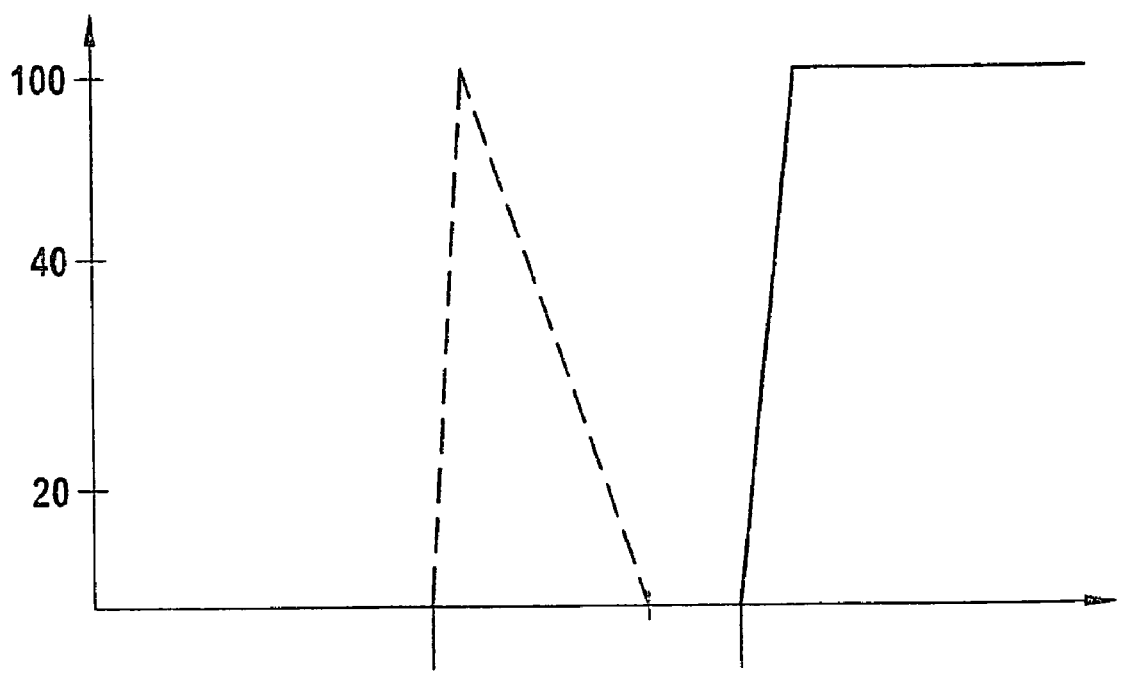
FIG. 8 shows a characteristic of the restoring force of the accelerator pedal as a function of an accelerator pedal position for signaling different types of information relevant for operating the motor vehicle.

FIG. 8 therefore shows the resulting haptic signal Ffbges as a percentage of the possible restoring force plotted against the position wped of the accelerator pedal. Between a first accelerator pedal position wpedbe1 and a second accelerator pedal position wpedbe2, this yields a saw-tooth-shaped characteristic of the resulting haptic signal Ffbges for the haptic signaling of a specified consumption per unit of distance. The leveling off of the saw-tooth-shaped characteristic may occur for example at such a moderate slope that, as far as possible, it goes unnoticed by the driver. In a further third accelerator pedal position wpedsonst, which is greater than first accelerator pedal position wpedbe1 and greater than second accelerator pedal position wpedbe2, the resulting haptic signal Ffbges rises from zero again to 100% and remains at 100% for accelerator pedal positions greater than third accelerator pedal position wpedsonst so as to signal the optimum engine efficiency factor at third accelerator pedal wpedsonst.

Thus via the haptic signaling on accelerator pedal 1 and thus on one single control element it is possible to represent several different types of information relevant for operating the motor vehicle and for the driver to register them.

The method according to the present invention and the device according to the present invention thus show how it is possible to transmit several haptic signals via one single accelerator pedal 1. The saw-tooth-shaped characteristic of the restoring force, which is used in this example for signaling the consumption per unit of distance, has the advantage that it allows for the maximum magnitude of the restoring force to be used. This makes it possible for the driver to distinguish clearly between different types of information relevant for operating the motor vehicle, which are represented using the maximum restoring force at different positions of accelerator pedal 1.

To this end, the different items of information are represented by unambiguous haptic signals at different positions of accelerator pedal 1. In this example, the unambiguousness is achieved by the fact that the different haptic signals each have a maximum, for example in the form of a saw tooth or of a maintenance of the maximum in the case of signaling the optimum engine efficiency factor.

Compared to visual or auditory signals, a haptic signal is perceived as particularly pleasant and is moreover constantly present to the consciousness of the driver.

What is claimed is:

1. A method for signaling several items of information relevant for operating a motor vehicle having a drive unit, comprising:
   representing different items of information by using unambiguous haptic signals at different positions of a control element of the vehicle;
   forming the different items of information by different fuel consumption values;
   respectively representing the different fuel consumption values by a characteristic of one of the haptic signals on the control element having a maximum at the associated position of the control element;
   determining a specific fuel consumption from a resulting setpoint value for an output variable of the drive unit and a current engine speed;
   converting said specific fuel consumption into a consumption per unit of distance value; and
   ascertaining the one of the haptic signals as a function of said consumption per unit of distance using an additional characteristics function.

2. The method as recited in claim 1, wherein:
the haptic signals have a maximum.

3. The method as recited in claim 1, wherein:
the control element includes an accelerator pedal.

4. The method as recited in claim 1, wherein:
the characteristic of the one of the haptic signals includes a saw-tooth-shaped characteristic.

5. The method as recited in claim 1, further comprising:
specifying at least one of the fuel consumption values using an input unit.

6. The method as recited in claim 1, further comprising:
forming the one of the haptic signals by a restoring a force acting on the control element.

7. A device for signaling several items of information relevant for operating a motor vehicle, having a drive unit, comprising:
   an arrangement for representing different items of information by using unambiguous haptic signals at different positions of a control element of the vehicle;
   an arrangement for forming the different items of information by different fuel consumption values;
   an arrangement for respectively representing the different fuel consumption values by a characteristic of one of the haptic signals on the control element having a maximum at the associated position of the control element;
   an arrangement for determining a specific fuel consumption from a setpoint value for an output variable of the drive unit and a current engine speed using a characteristics function, and for determining a consumption per unit of distance from the specific fuel consumption; and
   an arrangement for ascertaining the one of the haptic signals as a function of said consumption per unit of distance using an additional characteristics function.

8. The device as recited in claim 7, wherein:
the haptic signals have a maximum.

9. The device as recited in claim 7, wherein:
the control element includes an accelerator pedal.

10. The device as recited in claim 7, wherein:
the characteristic of the one of the haptic signals includes a saw-tooth-shaped characteristic.

* * * * *